United States Patent
Weber

(10) Patent No.: US 10,502,278 B2
(45) Date of Patent: Dec. 10, 2019

(54) AIR SPRING

(71) Applicant: Vibracoustic CV Air Springs GmbH, Hamburg (DE)

(72) Inventor: Michael Weber, Buchholz i.d.N. (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 141 days.

(21) Appl. No.: 15/262,088

(22) Filed: Sep. 12, 2016

(65) Prior Publication Data
US 2017/0074342 A1    Mar. 16, 2017

(30) Foreign Application Priority Data
Sep. 11, 2015 (DE) .......................... 10 2015 115 400

(51) Int. Cl.
| | |
|---|---|
| F16F 9/08 | (2006.01) |
| F16F 9/084 | (2006.01) |
| F16F 9/04 | (2006.01) |
| B60G 15/12 | (2006.01) |
| B60G 17/052 | (2006.01) |
| B62D 33/06 | (2006.01) |
| F16F 9/06 | (2006.01) |
| F16F 9/43 | (2006.01) |
| F16F 9/50 | (2006.01) |

(52) U.S. Cl.
CPC ............ *F16F 9/084* (2013.01); *B60G 15/12* (2013.01); *B60G 17/0521* (2013.01); *B60G 17/0525* (2013.01); *B60G 17/0528* (2013.01); *B62D 33/0608* (2013.01); *F16F 9/04* (2013.01); *F16F 9/062* (2013.01); *F16F 9/43* (2013.01); *F16F 9/50* (2013.01); *B60G 2500/201* (2013.01); *B60G 2500/202* (2013.01); *F16F 2222/12* (2013.01); *F16F 2228/066* (2013.01)

(58) Field of Classification Search
CPC . F16F 9/084; F16F 9/104; F16F 9/062; B60G 15/12; B60G 17/0521; B60G 17/0523; B60G 17/0525; B60G 17/0528; B60G 17/0485; B60G 17/033; B60G 11/27
See application file for complete search history.

(56) References Cited

U.S. PATENT DOCUMENTS

| | | | |
|---|---|---|---|
| 5,649,692 A * | 7/1997 | Gilsdorf ................ | B60G 11/26 267/64.21 |
| 6,332,624 B1 | 12/2001 | Gilsdorf et al. | |
| 2011/0115139 A1 | 5/2011 | Moulik et al. | |
| 2015/0191068 A1 * | 7/2015 | Kantor ................. | B60G 11/27 280/6.157 |

FOREIGN PATENT DOCUMENTS

| | | |
|---|---|---|
| DE | 102010012346 A1 | 9/2011 |
| DE | 102011108249 A1 | 1/2013 |
| DE | 102011114570 A1 | 4/2013 |
| WO | WO 2010006159 A2 | 1/2010 |

* cited by examiner

*Primary Examiner* — Melanie Torres Williams
(74) *Attorney, Agent, or Firm* — Leydig, Voit & Mayer, Ltd.

(57) ABSTRACT

An air spring for damping and controlling a level position of a driver's cab or of a motor vehicle includes a lid, a rolling piston and at least one air spring bellows. At least one damping device is integrated into the air spring. A level control system is integrated into the air spring and is configured to at least one of supply and discharge compressed air, gas or a compressible medium so as to control the level position of the driver's cab or of the motor vehicle.

14 Claims, 2 Drawing Sheets

AIR SPRING

CROSS-REFERENCE TO PRIOR APPLICATION

Priority is claimed to German Patent Application No. DE 10 2015 115 400.5, filed on Sep. 11, 2015, the entire disclosure of which is hereby incorporated by reference herein.

FIELD

The present invention relates to an air spring for damping and controlling the level position of a driver's cab or of a motor vehicle.

BACKGROUND

Air springs of the kind mentioned above cushion two parts that are moveable relative to each other and thus increase the suspension comfort of motor vehicles and driver's cabs. Conventional air springs have a rubber air spring bellows connected to a closure member most frequently configured as a lid and a rolling piston in order to form a working space sealed in an air-tight manner. The working space is filled with a fluid, in particular compressed air, as a working medium. During spring contraction and extension, the air spring bellows rolls on the outer surface of the rolling piston and thus cushions in vibrations that are introduced.

In addition to the above-described cushioning function, a damping function can also be integrated into an air spring. Such an air spring may also be referred to as an air spring damper. Damping most frequently takes place by the working medium flowing back and forth between the working space and another chamber via a damping channel. Due to the constricted cross section of the damping channel and the accompanying friction, the introduced vibrations are damped. Different damping characteristics can be set by varying the damping channel cross section.

Moreover, air springs are also used to keep a desired level position of a motor vehicle or of a driver's cab constant at different loads or weight loads, or to change it in adjustable manner. This is done by filling the working space with compressed air or by releasing compressed air from the working space. For this purpose, the working space is connected to a compressed-air control device that changes the spring stroke depending on the load state or the weight loads. Compressed air is most frequently filled in or released via control valves disposed outside the working chamber.

From DE 10 2011 108 249 A1, an air spring is known which has a mechanically operable control valve integrated into the air spring for controlling the level position of a motor vehicle or of a driver's cab. The control valve is mounted on the lid and comprises regulating valves for regulating the compressed-air supply or the compressed-air release. The pressure-regulating valves are actuated via cams attached to a rotatable camshaft. In the process, the rotary movement of the camshaft takes place via a drag lever, which rests with its free end on a contact surface on the rolling piston of the air spring. The camshaft is turned by the pivoting movement of the drag lever, whereby one of the cams, depending on the contraction or extension of the air spring, actuates one of the tappets of the regulating valves kept shut by spring forces.

Furthermore, an air spring assembly with an integrated valve control system for controlling the level position of a motor vehicle or of a driver's cab is presented by DE 10 2011 114 570 A1. The integrated valve control system comprises an air inlet valve and an air outlet valve disposed in the region of a lid. A compression spring assembly formed of two parts is provided for opening and closing the valves. The compression spring assembly has a central spring facing towards the rolling piston or the lid and a control valve biasing spring facing towards the air release valve. The central spring and the control valve biasing spring are disposed on a guide tube mounted in an axially freely movable manner between the rolling piston and the lid. A radially protruding stop, which serves as a control means for actuating the valve tappet of the inlet valve, is disposed between the two springs. The compression spring assembly is retained between biasing means, with one of the biasing means contacting the outlet valve. During spring contraction, the guide tube slides downwards, and at the same time, the control valve biasing spring is compressed until the stop contacts the inlet valve after covering a free distance and actuates it. During spring extension, the guide tube moves upwards, with the control valve biasing spring extending so that the biasing means associated with the outlet valve moves away from it and the outlet valve is opened.

SUMMARY

In an embodiment, the present invention provides an air spring for damping and controlling a level position of a driver's cab or of a motor vehicle. The air spring includes a lid, a rolling piston and at least one air spring bellows. At least one damping device is integrated into the air spring. A level control system is integrated into the air spring and is configured to at least one of supply and discharge compressed air, gas or a compressible medium so as to control the level position of the driver's cab or of the motor vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
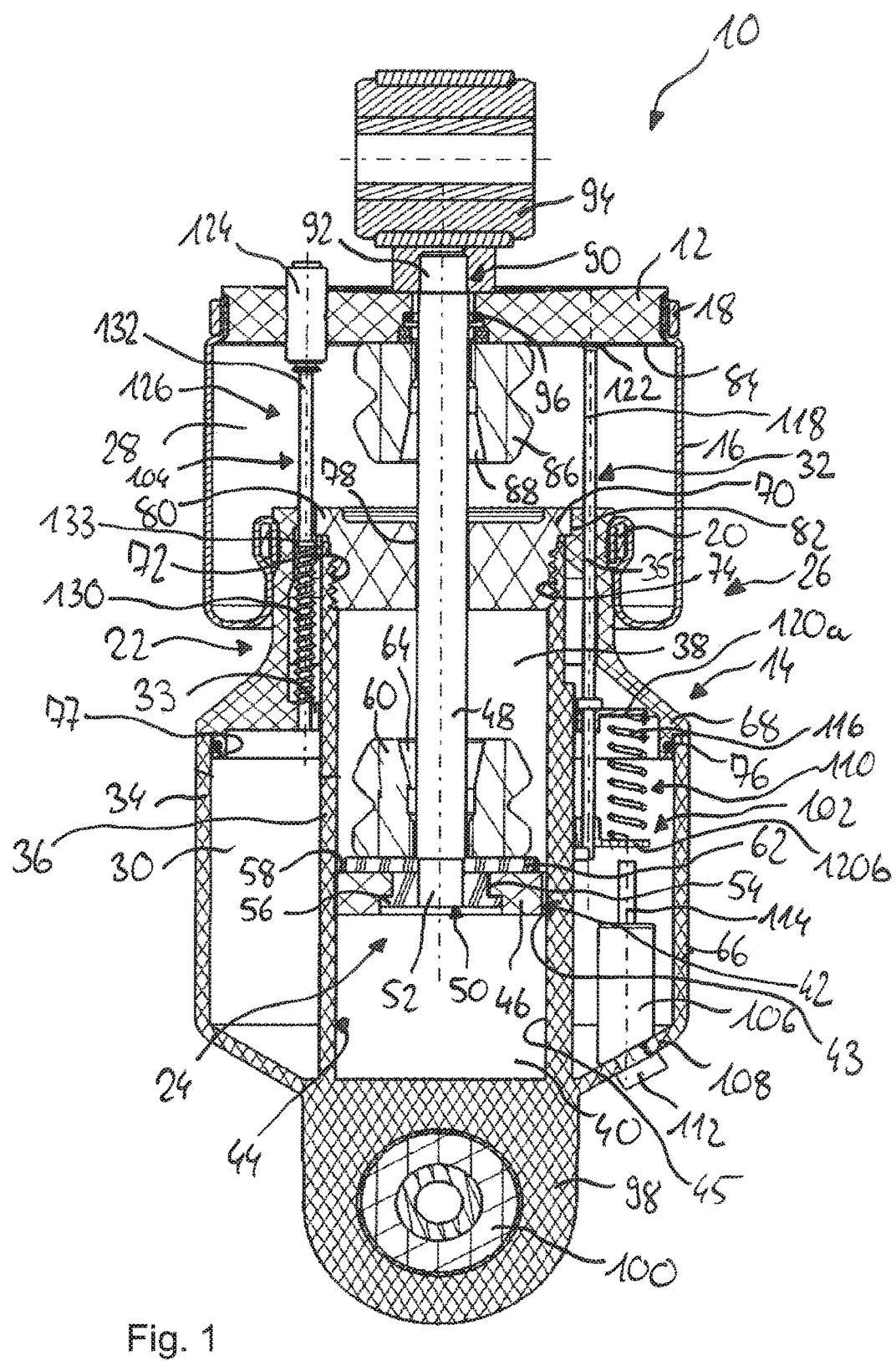
FIG. 1 shows a longitudinal section through an air spring according to a first embodiment.

In an embodiment, the present invention provides an air spring that has an increased damping action, a level regulation and at the same time a simple and compact construction, and which, additionally, is cost-effective to manufacture.

The air spring for damping and controlling the level position of a driver's cab or of a motor vehicle has a lid, a rolling piston and at least one air spring bellows, with a damping device being integrated into the air spring, and with a level control system for supplying and/or discharging compressed air, gas or a compressible medium being integrated into the air spring in order to control the level position of the driver's cab or of the motor vehicle. Due to the damping device integrated into the air spring, the air spring is of a compact construction, so that the required construction space of the air spring is reduced. In addition, an external guide for the air spring bellows can be omitted, which simplifies the assembly of the air spring and thus renders its manufacture cost-effective. The level position of a driver's cab or of a motor vehicle at different loads or weight loads can be kept constant or changed by means of the level control system.

The damping device can be configured as an air spring damper using air, in particular compressed air, as a working medium. In addition, the damping device can use gas or a compressible medium as a working medium. Moreover, the damping device can be configured as a hydraulic damper.

Advantageously, at least two damping devices are integrated into the air spring. By integrating two damping devices into the air spring, the damping action, and thus the damping effect, is increased.

In an advantageous embodiment, the two damping devices are connected in parallel. Thus, the damping action can be increased since both damping devices are active during spring contraction or extension. In addition, two damping actions that are independent from one another can be produced by connecting the two damping devices in parallel.

In an advantageous embodiment, a first damping device has a first chamber with a variable volume, a second chamber whose volume remains constant and a first damping channel device connecting the two chambers with each other. Furthermore, a second damping device advantageously has a third chamber with a variable volume, a fourth chamber with a variable volume and a second damping channel device connecting the two chambers with each other. The first, third and fourth chambers with variable volumes can be referred to as active volumes, and the second chamber whose volume remains constant can be referred to as a passive volume. During spring contraction and extension, the volume of the variable chambers changes, so that the compressed air located in the chambers or the gas or compressible medium located in the chambers flows back and forth via the respective damping channel devices and thus generates a damping action. By varying the diameter of the damping channel device it is possible to adapt the damping devices to different vibration frequencies. Furthermore, the cross section of the damping channel devices can be capable of being unblocked or shut by means of one valve in each case. Thus, the damping function can be switched on or off, or the damping characteristic can be altered. The first damping channel device can have a damping channel or multiple damping channels that connect the first chamber and the second chamber with each other. The second damping channel device can have a damping channel or multiple damping channels that connect the third chamber and the fourth chamber with each other.

Advantageously, the first chamber is delimited by the lid, the rolling piston and the air spring bellows, and the second chamber is delimited by the rolling piston, with the first damping channel device being incorporated into the rolling piston. During spring contraction, the volume of the first chamber is reduced, so that the compressed air located in the first chamber or the gas or compressible medium located in the first chamber flows via the damping channel device into the second chamber formed in the rolling piston. During spring extension, the volume of the first chamber increases so that a negative pressure is generated, which causes the compressed air located in the second chamber or the gas or compressible medium located in the second chamber to flow via the first damping channel device back into the first chamber. A damping action is produced due to this reciprocating flow. Advantageously, the second chamber is delimited by an outer wall and an inner wall of the rolling piston. Thus, the volume of the second chamber does not change and always remains constant during a spring contraction and extension of the air spring. Advantageously, the second chamber integrated into the rolling piston constitutes an additional volume. The first damping channel device can be formed from one damping channel incorporated into the damping channel device and/or multiple damping channels incorporated into the damping channel device.

The third chamber and the fourth chamber can be delimited by a cylindrical housing formed in the rolling piston, with the third and fourth chambers being separated from each other by a movable piston. Advantageously, the second damping channel device is formed between the piston and the cylindrical housing and/or the second damping channel device is incorporated into the piston. The second damping channel device can be formed as a damping channel incorporated into the piston which connects the third chamber and the fourth chamber with each other. Furthermore, the second damping channel device can be formed by a gap formed between the piston and the inner face of the cylindrical housing. To this end, the piston can be spaced apart from an inner face of the cylindrical housing. Furthermore, the second damping channel device can have multiple damping channels. For example, a damping channel can be incorporated into the piston and another damping channel can be formed by a gap formed between the piston and the inner face of the cylindrical housing. During spring contraction, the fourth chamber can be compressed and the third chamber can be enlarged, with the compressed air, the gas or the compressible medium flowing via the second damping channel device from the fourth chamber into the third chamber. During spring extension, the volume of the third chamber can be reduced and the volume of the fourth chamber can be increased, with the compressed air, the gas or the compressible medium flowing via the second damping channel device from the third chamber into the fourth chamber. A damping effect is obtained by the reciprocating flow of the compressed air, the gas or the compressible medium via the second damping channel device. The cylindrical housing can be formed by an inner wall of the rolling piston. Also advantageously, the cylindrical housing is surrounded by the second chamber. Due to a movement of the piston during spring contraction and extension, the volumes of the third and fourth chambers are alternately reduced and increased, with the compressed air, the gas or the compressible medium flowing back and forth via the damping channel device.

Preferably, the chambers are configured as air chambers, in particular as compressed-air chambers. Moreover, the chambers can also be filled with a gas or a compressible medium.

Advantageously, the piston is guided within the cylindrical housing.

Also advantageously, the piston is connected to a piston rod, the piston rod being attached to a lid. During a spring contraction and extension, the piston is moved back and forth within the housing by means of the piston rod. The piston can be connected to the piston rod by force fit and/or by substance-to-substance connection.

Advantageously, the level control system comprises a compressed-air inlet device for supplying compressed air and a compressed-air outlet device for discharging compressed air. Thus, the level position of a motor vehicle or of a driver's cab can be kept constant or variably controlled during loading and unloading. Furthermore, the compressed-air inlet device can be configured for supplying gas or a compressible medium, and the compressed-air outlet device can be configured for discharging gas or a compressible medium.

Advantageously, the compressed-air inlet device and the compressed-air outlet device are configured in such a way that, during spring contraction, the compressed-air inlet device is opened after a first clearance is overcome, and during spring extension, the compressed-air outlet device is opened after a second clearance is overcome. The clearances ensure that the valves are not immediately opened in the case of small spring contraction and extension movements. Advantageously, the clearances are between 1 mm and 10 mm, preferably between 2 mm and 6 mm. Also advantageously, the compressed-air outlet device is closed during a spring contraction and the compressed-air inlet device is closed during a spring extension.

In an advantageous embodiment, the compressed-air inlet device has at least one inlet valve and a first valve control device. The inlet valve is opened during a spring contraction by means of the valve control device in order to supply compressed air, gas or a compressible medium to the air spring. Advantageously, the inlet valve is connected to a compressed-air source, a gas source or a source with a compressible medium that supplies the air spring with compressed air, gas or a compressible medium via the inlet valve.

In an advantageous embodiment, the first valve control device has at least one first compression spring and a tappet connected to the compression spring. Advantageously, such a valve control device is integrated into the piston rod and cooperates with an inlet valve integrated into the rolling piston and protruding into the fourth chamber.

In an advantageous embodiment, the first valve control device has at least one first compression spring, a guide rod and biasing members disposed in a freely movable manner on the guide rod, with the first compression spring being accommodated between the two biasing members. Advantageously, such a valve control device is connected to the lid and cooperates with an inlet valve integrated into the rolling piston and protruding into the second chamber. Also advantageously, the guide rod is connected to the lid and extends via the first chamber and the first damping channel into the second chamber, with the first compression spring and the biasing members being disposed on the free end of the guide rod located within the second chamber. Advantageously, the first valve control device is spaced apart from the inlet valve, in particular its tappet, in a neutral position or zero position, in order thus to form the first clearance. Only when the first clearance is overcome, the compression spring presses against the inlet valve, in particular against its tappet, via one of the biasing members, so that the inlet valve is opened and compressed air, gas or compressible medium is able to flow into the working chamber. During a continued spring contraction, the compression spring is compressed.

Advantageously, the inlet valve is integrated into the rolling piston. The inlet valve can be disposed within the second chamber or the fourth chamber. The valve control device can be integrated into the piston rod or the lid.

The compressed-air outlet device can have at least one outlet valve and a second valve control device. The outlet valve is controlled via the second valve control device in order thus to discharge compressed air, gas or a compressible medium from the air spring.

In an advantageous embodiment, the second valve control device has a second compression spring and a control rod connected to the compression spring. Advantageously, the second compression spring presses against the outlet valve, so that the latter remains shut during a spring contraction. The control rod moves away from the outlet valve only during a spring extension, so that the outlet valve is opened.

Advantageously, the outlet valve is integrated into the lid, and the second valve control device is integrated into the rolling piston. Preferably, the second valve control device is disposed within the first damping channel, with the control rod extending through the first chamber in the direction of the outlet valve integrated into the lid. Also advantageously, the second compression spring and the control rod are configured in such a manner that the second compression spring is biased into a neutral position or zero position. Thus, the second clearance can be realized, so that due to the biasing action, the control rod continues to press against the outlet valve and keeps it shut during small spring extension movements.

Also advantageously, the rolling piston comprises a bottom part, a top part having a rolling contour, and a lid member, the lid member being connectable to the bottom part and the top part in such a way that all parts are fixed relative to one another. Preferably, the second chamber and the cylindrical housing delimiting the third and fourth chambers are formed in the bottom part. Advantageously, the lid member is connected to the bottom part by force fit and/or positive fit. For this purpose, the lid member can be provided with a male thread that can be screwed into a female thread formed in the bottom part. Advantageously, the lid member can be screwed into the cylindrical housing of the rolling piston. Also advantageously, the lid member is provided with a passageway through which the piston rod can extend. Advantageously, the passageway connects the first chamber and the third chamber. The first damping channel device can be incorporated into the top part. In order to assemble the rolling piston, the top part can be placed on the bottom part, wherein a sealing member, in particular an O-ring, can be interposed between the top part and the bottom part for sealing. Then, the lid member can be connected to the bottom part, in particular screwed into the bottom part. In the process, the lid member braces the top part against the bottom part and thus fixes all the parts relative to one another. Advantageously, the lid member has a peripheral projection that can engage with a recess formed on the top part in order thus to brace and fix the top part against the bottom part.

In an advantageous embodiment, the piston has a first buffer that limits the movement of the piston. Preferably, the first buffer cooperates with the housing, in particular its lid member. The first buffer can be disposed on a surface of the piston facing towards the lid member. Advantageously, the first buffer is provided with a passageway through which the piston rod can extend. Alternatively, the buffer can be disposed on an underside of the piston facing towards the fourth chamber, or within the fourth chamber. Advantageously, the first buffer is made of an elastomeric material. Also advantageously, the first buffer is configured to be soft in order to obtain a soft characteristic curve during an impact. The first buffer can be connected to the piston by substance-to-substance connection.

Advantageously, the lid has a second buffer that limits a movement of the lid and/or of the rolling piston. Advantageously, the second buffer is disposed on a side of the lid facing towards the first chamber. Also advantageously, the second buffer has a passageway through which the piston rod can extend. During a spring contraction and extension, the second buffer limits a movement of the lid and/or the rolling piston. Advantageously, the second buffer is made of an elastomeric material. Also advantageously, the first buffer is configured to be soft in order to obtain a soft characteristic curve during an impact. The second buffer can be connected to the lid by substance-to-substance connection.

In an advantageous embodiment, the rolling piston is made from plastic, in particular from a fiber reinforced plastic.

FIG. 1 shows an air spring 10, which serves for damping and regulating the level of a driver's cab or a motor vehicle. The air spring 10 has a lid 12, a rolling piston 14 and an air spring bellows 16 connecting the lid 12 and the rolling piston 14 with each other. The air spring bellows 16 is attached in an air tight manner to the lid 12 by means of a first clamp ring 18 and to the rolling piston 14 by means of a second clamp ring 20. In addition, a first damping device 22 and a second damping device 24 are integrated into the air spring 10, with the two damping devices 22, 24 being connected in parallel to each other. Furthermore, the air spring 10 has a level regulating system 26 for supplying and/or discharging compressed air, gas or a compressible medium in order to control the level position of a driver's cab or of a motor vehicle.

The first damping device 22 has a first chamber 28 with a variable volume, a second chamber 30 whose volume remains constant and a first damping channel device 32 connecting the two chambers 28, 30 with each other. The first damping channel device 32 comprises a first damping channel 33 and a second damping channel 35 that connect the first chamber 22 and the second chamber 24 with each other. The first chamber 28 is delimited by the lid 12, the rolling piston 14 and the air spring bellows 16. The second chamber 30 is integrated into the rolling piston 14 as an additional volume and is delimited by an outer wall 34 and an inner wall 36 of the rolling piston 14. The first damping channel 33 and the second damping channel 35 that connect the two chambers 28, 30 are incorporated into the rolling piston 14.

The second damping device 24 has a third chamber 38 with a variable volume, a fourth chamber 40 with a variable volume and a second damping channel device 42 connecting the two chambers 38, 40 with each other. The two chambers 38, 40 are delimited by a cylindrical housing 44 formed by the inner wall 36. A movable piston 46, which separates the two chambers 38, 40 from each other, is disposed within the cylindrical housing 44. The second damping channel device 42 has a third damping channel 43. The third damping channel 43 is formed by a gap formed between the piston 46 and an inner face 45 of the cylindrical housing 44. The piston 46 is guided within the cylindrical housing 44.

The piston 46 is connected to a piston rod 48, which is attached on its end to the lid 12. At its first end 50, the piston rod 48 is connected to the piston 46. For this purpose, the piston rod 48 has a first threaded portion 52 that is inserted into a first passageway 54 of the piston 46. In order to fix the piston rod 48 to the piston 46, a nut 56 is then screwed onto the first threaded portion 52 from below.

A first buffer 60, which is preferably made from an elastomeric material, is disposed on a top side 58 of the piston 46. The first buffer 60 is disposed on a plate 62, in particular connected thereto by substance-to-substance connection, with the plate 62 resting on the top side 58 of the piston 46 and being fixed to the piston 46 via the piston rod 62 and the nut 56. In addition, the first buffer 60 is provided with a second passageway 64, through which the piston rod 48 extends.

The rolling piston 14 is formed from multiple parts and has a bottom part 66, a top part 68 having a rolling contour and a lid member 70. The second chamber 30 and the cylindrical housing 44 delimiting the third chamber 38 and the fourth chamber 40 are formed in the bottom part 66. The air spring bellows 16 is attached to the top part 68 by means of the second clamp ring 20. During a spring contraction, the air spring bellows 16 rolls over the outer contour, or the outer contour forming the one rolling contour, of the top part 68. The bottom part 66 and the top part 68 are connected to each other via the lid member 70. For this purpose, the lid member 70 has a male thread 72 that can be screwed into a female thread 74 of the cylindrical housing 44. In order to assemble the rolling piston 14, the top part 68 is placed on the bottom part 66, wherein a first sealing member 76, in particular an O-ring, is interposed between the top part 68 and the bottom part 66. To this end, the top part 68 has a peripheral rim 77 with a groove into which the first sealing member 76 can be inserted. Then, the piston 46, together with the piston rod 48 attached thereto and the first buffer 60, is inserted into the cylindrical housing 44 and closed by means of the lid member 70. For this purpose, the lid member 70 has a third passageway 78 through which the piston rod 48 can extend when the lid member 70 is pushed onto the piston rod 48 and finally screwed into the female thread 74. The first chamber 28 and the third chamber 38 can be connected to each other via the passageway 78. The lid member 70 has a peripheral projection 80 that engages with a recess 82 formed on the top part 68 and thus braces and fixes the top part 68 against the bottom part 66.

A second buffer 86 is disposed at an underside 84 of the lid 12; in particular, the second buffer 86 is connected by a substance-to-substance connection to the underside 84 of the lid 12. The second buffer 84 is made from an elastomeric material and has a fourth passageway 88 through which the piston rod 48 extends. In addition, the piston rod 48 extends through the lid 12 and has at its second end 90 a second threaded portion 92, onto which a first elastomer mount 94 is screwed. The first elastomer mount 94 fixes the piston rod 48 on the lid 12. In order to seal the first chamber 28 with respect to the environment, a second sealing member 96, in particular an O-ring, is disposed between the lid 12 and the piston rod 48. The rolling piston 14, in particular the bottom part 66, additionally has an accommodating portion 98 into which a second elastomer mount 100 is inserted, in particular pressed.

The level control system 26 has a compressed-air inlet device 102 for supplying compressed air, gas or a compressible medium, and a compressed-air outlet device 104 for discharging compressed air, gas or a compressible medium.

The compressed-air inlet device 102 has an inlet valve 106 that is integrated into a base 108 of the second chamber 30 and protrudes into the second chamber 30, and a first valve control device 110. The inlet valve 106 can be connected with a compressed-air source, a gas source or a source with a compressible medium via a connecting device 112, and additionally has a tappet 114 for actuating the inlet valve 106. The first valve control device 110 has a first compression spring 116, a guide rod 118 and two biasing members 120a, 120b disposed in a freely movable manner on the guide rod 118, with the first compression spring 116 being accommodated between the two biasing members 120a, 120b. At its end, the guide rod 118 has a thread 122 with which the guide rod 118 is screwed into the lid 12. The guide rod 118 extends from the lid 12 via the first damping channel 32 into the second chamber 30. The biasing members 120a, 120b are disposed in a freely movable manner on the piston rod 118 on the section of the guide rod 118 located in the second chamber 30, accommodating the first compression spring 116. The second biasing member 120b is spaced apart from the tappet 114 of the inlet valve 106 in the neutral position or zero position shown in FIG. 1, in order thus to form a first clearance.

The compressed-air outlet device 104 has an outlet valve 124 integrated into the lid 12 and a second valve control device 126 for actuating the outlet valve 124. The second valve control device 126 has a second compression spring 130 and a control rod 132 connected to the second compression spring 130. The second compression spring 130 is disposed in the first damping channel 32, with a first section of the control rod 132 being inserted into the second compression spring 130. A second section of the control rod 132 extends through the first chamber 28 and, at its end, contacts the outlet valve 124. The control rod 132 further has a step 133 contacting the second compression spring 130. In the neutral position or zero position shown in FIG. 1, the step 133 presses the second compression spring 130 downwards and biases it. A second clearance is thus formed.

Hereinafter, the damping action and the level regulation of the air spring 10 are described. During the spring contraction or loading, the air spring bellows 16 rolls on the top part 68 so that the first chamber 28 is compressed. Thus, the compressed air located in the first chamber 28 or the gas or compressible medium located in the first chamber 28 flows via the first damping channel 33 and the second damping channel 35 into the second chamber 30 and thus generates a first damping effect. At the same time, the piston 46 is moved downwards by means of the piston rod 48 during a spring contraction, so that the volume of the third chamber 38 increases and the volume of the fourth chamber 40 is reduced at the same time. Thus, the compressed air, the gas or the compressible medium flows from the fourth chamber 40 via the third damping channel 43 into the third chamber 38 and thus generates a second damping effect in parallel to the first damping effect. In addition, the first valve control device 110 is moved in the direction of the tappet 114 of the inlet valve 106 during a spring contraction or loading, until the biasing member 120a has overcome the first clearance and contacts the tappet 114. In the event of a continued spring contraction or loading, the biasing member 120a presses the tappet 114 downwards, so that compressed air, gas or a compressible medium is able to flow in. During a continued spring contraction, the first compression spring 116 is compressed between the biasing member 120a, 120b until the second buffer 86 abuts the lid member 70. During the spring contraction, the outlet valve 124 remains closed due to the control rod 132 pressing against the outlet valve 124.

During a spring extension or unloading, the first chamber 28 is enlarged, so that, due to the negative pressure generated in the first chamber 28, the compressed air located in the second chamber 30 or the gas or compressible medium located in the second chamber 30 flows via the first damping channel 33 and the second damping channel 35 into the first chamber 28 and thus obtains a first damping effect. At the same time, the piston 46 is displaced in an upward direction during a spring extension or unloading, so that the third chamber 38 is compressed and the fourth chamber 40 is enlarged, with compressed air, gas or compressible medium flowing from the third chamber 38 via the third damping channel 43 into the fourth chamber 40, thus causing a second damping effect parallel to the first damping effect. At the same time, the second compression spring 130, due to its bias, at first presses the control rod 132 against the outlet valve 124 during a spring extension, so that the outlet valve 124 remains closed at first. Only when the second compression spring 130 presses the step 133 against the rolling piston 14, the second clearance is overcome, so that the lid 12, or the outlet valve 124, moves away from the control rod 132. The outlet valve 124 is opened thereby, so that compressed air, gas or compressible medium is able to flow out into the environment. The spring extension is limited by the first buffer 60 abutting against the lid member 70. The inlet valve 106 remains closed during a spring extension.

Figure 2:
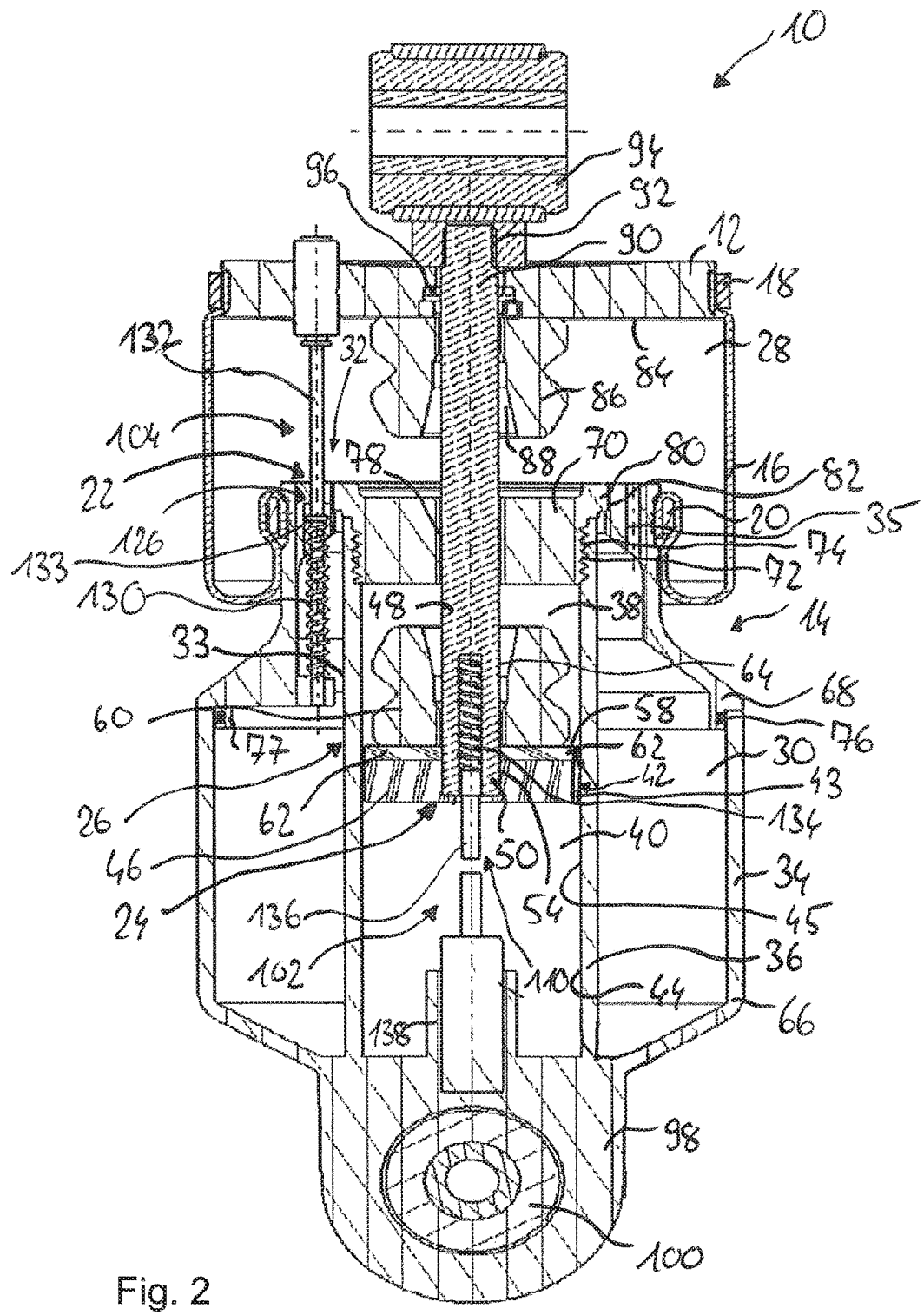
FIG. 2 shows a longitudinal section through an air spring according to a second embodiment.

FIG. 2 shows a second embodiment of the air spring 10 that differs from the first embodiment in the configuration and arrangement of the first valve control device 110, the arrangement of the inlet valve 106 and the attachment of the piston 46 and the second buffer 60 or the plate 62 on the piston rod 48. The first valve control device 110 is integrated into the piston rod 48 and has a third compression spring 134 integrated into the piston rod 48 and a second control rod 136, which is connected on its end with the third compression spring 134 and protrudes into the fourth chamber 40. The inlet valve 106 is integrated into the rolling piston 14, particularly into the accommodating portion 98, in such a way that the inlet valve protrudes into the fourth chamber 40. In order to be fixed, the inlet valve 106 is surrounded by a support wall 138 protruding from the rolling piston 14 into the fourth chamber 40. In the neutral position or zero position shown in FIG. 2, the control rod 136 is spaced apart from the tappet 114 of the inlet valve 106 in order thus to form the first clearance. The first valve control device 110 is moved in the direction of the tappet 114 of the inlet valve 106 during a spring contraction or loading, until the second control rod 136 has overcome the first clearance and contacts the tappet 114. In the event of a continued spring contraction or loading, the second control rod 136 presses the tappet 114 downwards, so that compressed air is able to flow in. During a continued spring contraction, the third compression spring 134 is compressed until the second buffer 86 abuts the lid member 70. In order to fasten the piston 48 and the plate 60 to the piston rod 48, they are pressed onto the first end 50 of the piston rod 48.

The air spring 10 is characterized by the integration of two damping devices 22, 24 connected in parallel. Thus, the damping action can be increased and the construction space required for the air spring can be reduced at the same time. In addition, an external guide for the air spring bellows 16 can be omitted, so that the assembly is simplified and the air spring can be manufactured cost-effectively at the same time. Furthermore, the level control system 26 integrated into the air spring 10 ensures that a desired level of the driver's cab or of the motor vehicle at different loads or weight loads is kept constant or changed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Air Spring
12 Lid
14 Rolling piston
16 Air spring bellows
18 First clamp ring
20 Second clamp ring
22 First damping device
24 Second damping device
26 Level control system
28 First chamber
30 Second chamber
32 First damping channel device
33 First damping channel
34 Outer wall
35 Second damping channel
36 Inner wall
38 Third chamber
40 Fourth chamber
42 Second damping channel device
43 Third damping channel
44 Cylindrical housing
45 Inner face
46 Piston
48 Piston rod
50 First end
52 First threaded portion
54 First passageway
56 Nut
58 Top side
60 First buffer
62 Plate
64 Second passageway
66 Bottom part
68 Top part
70 Lid member
72 Male thread
74 Female thread
76 First sealing member
77 Rim
78 Third passageway
80 Peripheral projection
82 Recess
84 Bottom side
86 Second buffer
88 Fourth passageway
90 Second end
92 Second threaded portion
94 First elastomer mount
96 Second sealing member
98 Accommodating portion
100 Second elastomer mount
102 Compressed-air inlet device
104 Compressed-air outlet device
106 Inlet valve
108 Base
110 First valve control device
112 Connecting device
114 Tappet
116 First compression spring
118 Guide rod
120a Biasing member
120b Biasing member
122 Thread
124 Outlet valve
126 Second valve control device
130 Second compression spring
132 Control rod
133 Step
134 Third compression spring
136 Second control rod
138 Support wall

The invention claimed is:

1. An air spring for damping and controlling a level position of a driver's cab or of a motor vehicle, the air spring comprising:
    a lid;
    a rolling piston;
    at least one air spring bellows;
    at least two damping devices integrated into the air spring; and
    a level control system integrated into the air spring and configured to at least one of supply and discharge compressed air, gas or a compressible medium so as to control the level position of the driver's cab or of the motor vehicle,
    wherein the level control system comprises a compressed-air inlet device configured to supply the compressed air, gas or the compressible medium, and a compressed-air outlet device configured to discharge the compressed air, gas or the compressible medium, and
    wherein the inlet valve is integrated into the rolling piston.

2. The air spring according to claim 1, wherein the at least two damping devices are connected in parallel.

3. The air spring according to claim 1, wherein the compressed-air inlet device and the compressed-air outlet device are configured in such a way that, during spring contraction, the compressed-air inlet device is opened after a first clearance is overcome, and during spring extension, the compressed-air outlet device is opened after a second clearance is overcome.

4. The air spring according to claim 1, wherein the compressed-air inlet device has at least one inlet valve and a first valve control device.

5. The air spring according to claim 4, wherein the first valve control device has at least one first compression spring and a tappet connected to the compression spring.

6. The air spring according to claim 4, wherein the first valve control device has at least one first compression spring, a guide rod and biasing members disposed in a freely movable manner on the guide rod, with the first compression spring being accommodated between the two biasing members.

7. The air spring according to claim 1, wherein the rolling piston comprises a bottom part, a top part having a rolling contour, and a lid member, the lid member being connectable to the bottom part and the top part in such a way that the parts are fixed relative to one another.

8. The air spring according to claim 1, wherein each of the at least two damping devices has two chambers.

9. An air spring for damping and controlling a level position of a driver's cab or of a motor vehicle, the air spring comprising:
- a lid;
- a rolling piston;
- at least one air spring bellows;
- at least one damping device integrated into the air spring; and
- a level control system integrated into the air spring and configured to at least one of supply and discharge compressed air, gas or a compressible medium so as to control the level position of the driver's cab or of the motor vehicle,
- wherein the at least one damping device includes a first damping device having a first chamber with a variable volume, a second chamber whose volume remains constant and a first damping channel device connecting the two chambers with each other.

10. The air spring according to claim 9, wherein the first chamber is delimited by the lid, the rolling piston and the air spring bellows, and wherein the second chamber is delimited by the rolling piston, with the first damping channel device being incorporated into the rolling piston.

11. The air spring according to claim 9, wherein the at least one damping device further comprises a second damping device having a third chamber with a variable volume, a fourth chamber with a variable volume and a second damping channel device connecting the two chambers with each other.

12. The air spring according to claim 11, wherein the third chamber and the fourth chamber are delimited by a cylindrical housing formed in the rolling piston, with the third and fourth chambers being separated from each other by a movable piston.

13. An air spring for damping and controlling a level position of a driver's cab or of a motor vehicle, the air spring comprising:
- a lid;
- a rolling piston;
- at least one air spring bellows;
- at least one damping device integrated into the air spring; and
- a level control system integrated into the air spring and configured to at least one of supply and discharge compressed air, gas or a compressible medium so as to control the level position of the driver's cab or of the motor vehicle,
- wherein the level control system comprises a compressed-air inlet device configured to supply the compressed air, gas or the compressible medium, and a compressed-air outlet device configured to discharge the compressed air, gas or the compressible medium,
- wherein the compressed-air outlet device has at least one outlet valve and a valve control device, and
- wherein the valve control device has a compression spring and a control rod connected to the compression spring.

14. The air spring according to claim 13, wherein the outlet valve is integrated into the lid, and wherein the valve control device is integrated into the rolling piston.

* * * * *